E. E. MERRILL.
COMPRESSED AIR SHOCK ABSORBER.
APPLICATION FILED JAN. 30, 1918.
1,319,783.
Patented Oct. 28, 1919.
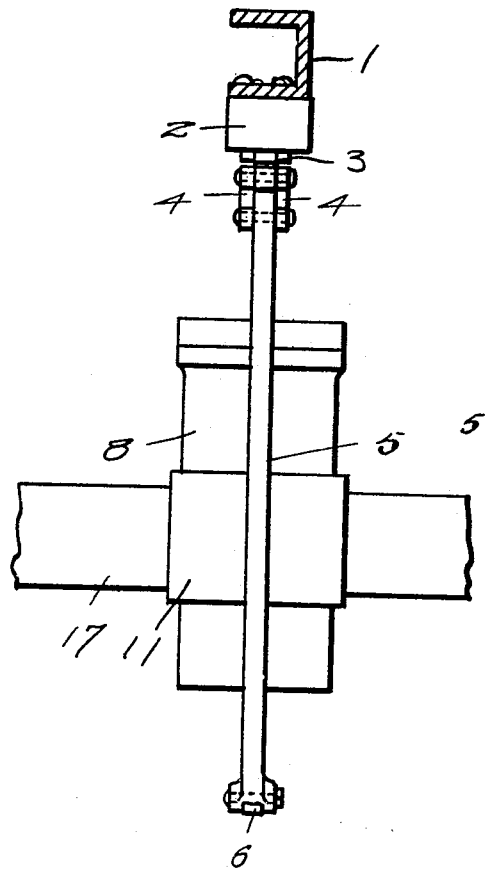
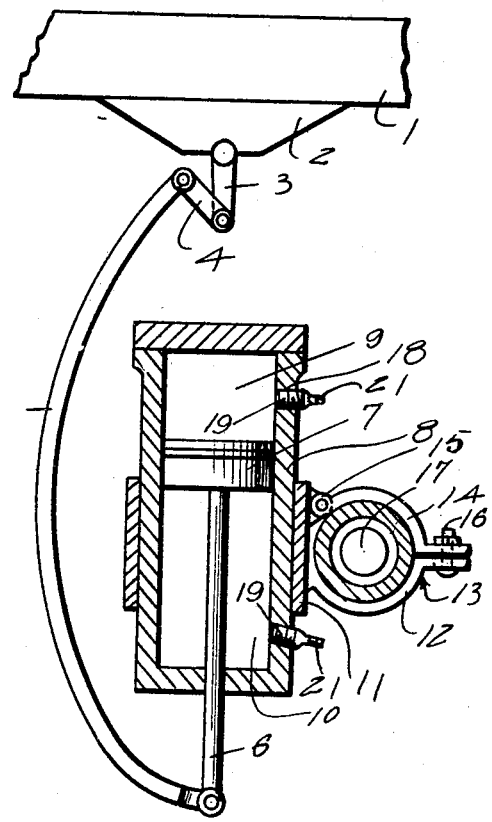
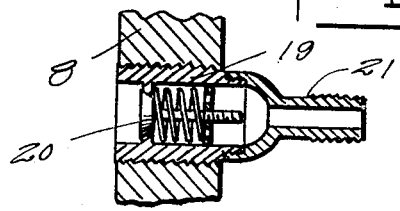
Inventor
E. E. Merrill

UNITED STATES PATENT OFFICE.

EDGAR E. MERRILL, OF DENVER, COLORADO, ASSIGNOR TO THE MERRILL SHOCK ABSORBER CO., A CORPORATION OF COLORADO.

COMPRESSED-AIR SHOCK-ABSORBER.

1,319,783.     Specification of Letters Patent.     Patented Oct. 28, 1919.

Application filed January 30, 1918. Serial No. 214,512.

*To all whom it may concern:*

Be it known that I, EDGAR E. MERRILL, a citizen of the United States, residing at Denver, in the county of Denver and State of Colorado, have invented certain new and useful Improvements in Compressed-Air Shock-Absorbers; and I do hereby declare the following to be a full, clear, and exact description of the invention, such as will enable others skilled in the art to which it appertains to make and use the same.

This invention relates to improvements in shock absorbers for vehicles and has for one of its objects the provision of a device of this character, whereby compressed air may be utilized to absorb shocks and jars caused by the vehicle passing over uneven ground.

Another object of this invention is the provision of a shock absorber of the above stated character, which shall be simple, durable and efficient, and which may be manufactured and sold at a comparatively low cost.

With these and other objects in view, as will become more apparent as the description proceeds, the invention consists in certain novel features of construction, combination, and arrangement of parts as will be hereinafter more fully described and claimed.

For a complete understanding of my invention, reference is to be had to the following description and accompanying drawings, in which:—

Figure 1 is a side elevation of a shock absorber constructed in accordance with my invention.

Fig. 2 is a vertical sectional view of the same, and

Fig. 3 is a fragmentary sectional view of a check valve.

Referring in detail to the drawing, the numeral 1 indicates the chassis of a vehicle such as an automobile or the like having secured thereto, a block 2, to which is pivoted an arm 3. The arm 3 has pivoted thereto a link 4 that is in turn pivoted to one end of an arcuate shaped member 5. The arcuate shaped member 5 depends downwardly and has its lower end pivoted to the lower end of a piston stem 6 of a piston 7. The piston 7 is slidably mounted within a cylinder 8 which has each end closed to form upper and lower compartments 9 and 10. A suitable plate 11 is formed on the cylinder and has formed thereon one section 12 of a clamp 13. The other section 14 of the clamp is pivoted to the plate as illustrated at 15 and is detachably secured to the other section 12 by means of a bolt 16 so that the clamp 13 may be readily secured about an axle 17.

The cylinder 8 has internally threaded ports 18 adjacent each end in which are threaded valve cages 19. The valve cages 19 have mounted therein suitable spring actuated check valves 20 and also have secured to their outer ends nipples 21 to which a pump or other auxiliary air supply may be connected for supplying the compartments 9 and 10 with air pressure if desired. When supplying the air pressure to the compartments 9 and 10 an equal amount is placed in each compartment so that the piston will be compelled to work against the same pressure in either direction.

In operation, when the vehicle passes over uneven ground, the axle 17 moves upwardly carrying therewith the cylinder 8. As the cylinder 8 moves upwardly, the air within the compartment 10 is compressed between the lower end of the cylinder and the piston, thus absorbing the shock to the body. The rebound of the body is absorbed by the air pressure within the compartment 9. Upon the rebound of the body, the body moves downwardly in the direction of the axle which causes the piston to move down in the cylinder and which will draw air into the compartment 9 by way of the upper check valve 20, and as the piston moves upwardly the air in the compartment 9 is compressed and air is drawn into the compartment 10 by way of the lower check valve. It will therefore be noted that the necessity of applying air pressure by an auxiliary means to the compartments 9 and 10 is not necessary as the piston will automatically draw air within the compartments as it moves upwardly and downwardly with relation to the cylinder.

While I have shown and described the preferred embodiment of my invention, it will be understood that minor changes in construction, combination and arrangement of parts may be made without departing from the spirit and scope of the invention as claimed.

Having thus described my invention, what I claim is:—

The combination with a vehicle having an axle, of a cylinder, a piston slidable in said cylinder, means admitting air to each end of the cylinder, a sectional clamp carried by said cylinder and adapted to receive the axle, and means securing the sections of the clamp together about the axle, an arcuate shaped member pivoted to the piston, a link pivoted to the other end of the arcuate shaped member, an arm pivoted to said link, and a block secured to said arm and to the vehicle.

In testimony whereof I affix my signature in presence of two witnesses.

EDGAR E. MERRILL.

Witnesses:
 ROSE F. KITT,
 J. T. LYON.